(12) United States Patent
Yoder et al.

(10) Patent No.: US 8,366,372 B2
(45) Date of Patent: Feb. 5, 2013

(54) GRAIN UNLOADING CONVEYOR WITH DIRECTABLE SPOUT AND CLOSURE APPARATUS AND SYSTEM

(75) Inventors: Denver R. Yoder, Manheim, PA (US); Andrew J. Horst, Reading, PA (US)

(73) Assignee: CNH America LLC, New Holland, PA (US)

( * ) Notice: Subject to any disclaimer, the term of this patent is extended or adjusted under 35 U.S.C. 154(b) by 158 days.

(21) Appl. No.: 13/052,483

(22) Filed: Mar. 21, 2011

(65) Prior Publication Data

US 2011/0170995 A1    Jul. 14, 2011

Related U.S. Application Data

(63) Continuation of application No. 12/424,121, filed on Apr. 15, 2009, now Pat. No. 7,938,613.

(51) Int. Cl.
*B60P 1/40* (2006.01)
(52) U.S. Cl. ...... 414/518; 414/519; 414/526; 198/550.1
(58) Field of Classification Search ................. 414/503, 414/518, 519, 526; 198/671, 550.1, 531, 198/532; 406/164; 460/114; 56/16.6
See application file for complete search history.

(56) References Cited

U.S. PATENT DOCUMENTS

| | | | |
|---|---|---|---|
| 4,540,086 A * | 9/1985 | David et al. .................. | 198/536 |
| 6,591,974 B2 * | 7/2003 | Tofin et al. .................. | 198/671 |
| 6,638,159 B2 * | 10/2003 | Krone et al. .................. | 460/114 |
| 6,767,174 B2 | 7/2004 | Cresswell | |
| 6,939,222 B2 | 9/2005 | Grossjohann et al. | |
| 7,063,614 B2 | 6/2006 | Vogelgesang et al. | |
| 7,938,613 B2 * | 5/2011 | Yoder et al. .................. | 414/518 |
| 2009/0110526 A1 | 4/2009 | Kinzebaw | |

* cited by examiner

*Primary Examiner* — Saul Rodriguez
*Assistant Examiner* — Jonathan Snelting
(74) *Attorney, Agent, or Firm* — Michael G. Harms

(57) ABSTRACT

An unloading conveyor apparatus and system for an agricultural harvester including a spout controllably directable for enabling distributing grain in a desired manner within a region of a receiving storage container, or a transporting truck, wagon, or other vehicle, and configurable as a closure for the conveyor for preventing entry of contaminants and the like. The spout can advantageously extend both the distance and range of variability of grain delivery location, and the free end of the spout can include a cover for improving grain delivery accuracy and wind resistance, and a break open feature to prevent damage. The spout can also be rotatable laterally about the end of the conveyor.

44 Claims, 9 Drawing Sheets

GRAIN UNLOADING CONVEYOR WITH DIRECTABLE SPOUT AND CLOSURE APPARATUS AND SYSTEM

CROSS-REFERENCE TO RELATED APPLICATIONS

The present application is a continuation of U.S. patent application Ser. No. 12/424,121 filed Apr. 15, 2009, by Denver R. Yoder, et al., which is incorporated by reference for all purposes in its entirety herein.

TECHNICAL FIELD

The present invention relates to an unloading conveyor apparatus and system for an agricultural harvester, and more particularly, to an unloading conveyor including a spout controllably directable for enabling distributing grain in a desired manner within a region of a receiving storage container, or a transporting truck, wagon, or other vehicle, and configurable as a closure for the conveyor for preventing entry of contaminants and the like.

BACKGROUND ART

Unloading of grain from harvesters such as combines, is typically accomplished using an elongate unloading conveyor. Such unloading conveyors typically are helical auger type conveyors contained in a tubular housing. The conveyors have a free or discharge end portion including a discharge opening through which the grain is propelled by the operation of the conveyor. On some conveyors, the discharge opening faces longitudinally or endwardly such that the grain is propelled more longitudinally outwardly, and on others the opening faces more downwardly such that the grain is correspondingly propelled more downwardly.

For many years, unloading conveyors have included rubbery boots configured for guiding or directing the grain discharged therefrom. However, such boots are not typically adjustable, and provide only minimal grain flow control and guidance, and little or no extension of the effective length of the conveyor. Such boots also do not provide a closure capability to prevent entry of contaminants, nor an ability to prevent dribbling of grain after use.

Rigid spouts for the discharge openings of unloading conveyors are also known, some of which being adjustable. Reference in this regard, Huen U.S. Pat. No. 2,625,001, entitled Grain Unloading Attachment, issued Jan. 13, 1953. This spout provides an extension ability, and some degree of remotely adjustable grain flow for an endwardly facing discharge opening, but provides no closure capability whatsoever, nor does it prevent grain dribbling. And, if move to an upwardly extending position so as to provide some closure, the spout would serve as a funnel for directing contaminants, rain and the like, into the end of the conveyor.

Haag U.S. Pat. No. 5,167,581, entitled Directable Spout For A Conveyor, issued Dec. 1, 1992, discloses a spout for a downwardly facing discharge opening, for directing grain directly down through a trapezoidal funnel incorporating a deflection plate to change the angle of discharge. However, no closure nor dribble prevention is provided, and the directional control capability is limited essentially to the region directly below the funnel, and no substantial effective length extension is achievable.

In regard to the importance of control or adjustment of grain flow, often, when unloading grain into a grain truck or wagon, the harvester and truck or wagon will be initially relatively positioned such that the receiving container is desirable positioned beneath the discharge opening of the unloading conveyor for receiving the flow of grain discharged therefrom. This can be relatively easy to accomplish if the harvester and receiving truck or wagon are stationary, but becomes more difficult if the harvester and the receiving truck or wagon are moving, and the difficulty increases further if the terrain is uneven and/or sloped, and/or a strong, gusting, and/or direction changing wind is present. Further, the grain holding capacity of many harvesters and receivers is quite large, and it may be required to have a capability to vary the grain flow location to spread the grain within a receiving truck or wagon to prevent spillage over the side of the receiver.

Still further, autonomous operation of harvesters and grain receiving vehicles is becoming more common, and it is desirable to have an improved capability to vary grain flow to a receiving vehicle to compensate or adjust for variances in the distance between or travel paths of the harvester and receiving vehicle, as well as elevational and angular differences. In this latter regard, to maintain productivity, it may be desired to unload while moving, with one or both of the harvester and receiving vehicle traversing uneven terrain, and/or tilted sidewardly, which may require frequent adjustments in grain flow location to achieve desired grain distribution within the receiving vehicle. It may also be desirable to enhance or increase the effective length of the unloading conveyor, particularly one with a downwardly facing discharge opening, without materially increasing the physical length of the conveyor, particularly when in its stored or transport position extending rearwardly from the harvester.

An anti-dribble capability is also a desirable feature, as it limits inadvertent grain loss and possible crop emergence in undesired areas where loose grain is dropped. And, an ability to provide a closure for the discharge opening of an unloading conveyor is desirable, to reduce grain dribbling, and to reduce or prevent entry of contaminants such as moisture, dust, leaves and the like, and also birds and rodents.

Accordingly, what is sought is a grain unloading conveyor apparatus and system which provides one or more of the capabilities, and overcomes one or more of the shortcomings and limitations, set forth above.

SUMMARY OF THE INVENTION

According to the present invention, what is provided is a grain unloading conveyor apparatus including a spout assembly and system which provides one or more of the capabilities, and overcomes one or more of the shortcomings and limitations, set forth above.

According to one preferred aspect of the invention, the unloading conveyor includes a conventionally constructed elongate auger tube having a discharge end and containing a helical unloading auger rotatably operable for conveying grain toward the discharge end in the well known manner. The discharge end of the tube has a lower portion including a peripheral edge portion bounding a downwardly facing discharge opening having a longitudinal extent and a lateral extent and through which the grain will be discharged generally downwardly by the operation of the auger. The peripheral edge portion includes a transversely extending lower peripheral edge portion longitudinally spaced from an endmost portion of the discharge end of the tube, and a protuberance of the spout assembly extends downwardly from the tube adjacent to the lower peripheral edge portion.

According to another preferred aspect, the spout assembly and system of the invention includes an elongate spout having a first open end portion, an opposite second open end portion, and spaced apart upwardly extending sidewall portions and a bottom therebetween, defining an upwardly open channel extending between the open end portions. The first open end portion of the spout includes a lower portion having a transverse shape at least substantially conforming to and marginally larger than the protuberance and is disposed therearound. The first open end portion has elements disposed above the lower portion, and includes pivot joints connecting to the tube and configured for allowing pivotal movement of the spout relative to the tube through a range of positions between a fully open position extending downwardly from the tube, and a closed position extending generally parallel to the tube in covering relation to the discharge opening. The lower portion of the first open end portion and the protuberance cooperate to prevent passage of grain therebetween and thus dribbling both when the spout is open and closed, and the sidewall portions preferably extend upwardly at least to side portions of the peripheral edge portion of the tube when the spout is in the partial and fully open positions to prevent grain loss therebetween, and to also reduce disturbance of grain flow by side winds.

According to another preferred aspect, the spout assembly and system of the invention includes an actuator connected to the spout and controllably operable for moving the spout through the range of positions between the fully open position and the closed position to enable adjusting the location of the flow of grain from the conveyor, for example, to compensate for any of the changing conditions discussed above. To facilitate adjustability, the spout preferably has a longitudinal extent greater than the longitudinal extent of the discharge opening, which beneficially increases the distance that the outflowing grain can travel longitudinally from the tube, and thus the effective length of the conveyor, and also allows providing a greater span of adjustability of grain delivery. It also allows the second or free end of the spout when closed to extend beyond the end of the tube, which also allows it to be covered, to provide greater grain delivery accuracy and control, particularly when windy.

According to another preferred aspect of the invention, the actuator is controlled by inputs from, for example, an input device, which can be an operator controlled device inside an operator cab of the harvester, or an automatic device, for instance, a processor operated controller, as part of an automatic unloading system or routine. As a non-limiting example, the spout can be positioned in the closed or non-operating position when the unloading conveyor is not operating, including when in both a non-operating transport position extending rearwardly from the harvester, and a deployed or unloading position extending sidewardly.

When the unloading conveyor is energized to operate, the spout can then be automatically moved to a preselected open position within the range, or the fully open position, or moved by an operator command to a selected position, for instance as required for desirably discharging the grain into a desired location within the receiving container. Then, as the unloading operation proceeds, as circumstances change, e.g., the selected location of the container fills, and/or the relative positions of the harvester and receiving vehicle and/or winds, change, the spout can be moved as desired or required. And, when the harvester has been unloaded or the container filled to the desired extent, the spout can be moved to the closed position, and the unloading operation terminated in the known manner.

According to additional preferred aspects of the invention, the spout can be configured such that when in the closed position, it forms a sealed condition in cooperation with adjacent regions of the tube, to limit or prevent entry of contaminants, e.g., moisture, dust, straw, leaves, birds, rodents, and the like. The spout can also include a cover portion over the open channel adjacent to the second end portion, for further guiding and containing the grain flow. The cover portion can be positioned and configured so as to be located endwardly beyond the discharge end of the tube when the spout is in the closed position, and can include structure so as to release or break open in the event a force is exerted thereagainst from within the channel, such as by deadheaded grain or the like. In this latter regard, the spout can optionally be constructed of a rigid, yet yieldable plastics material, so as to also resist damage from impacts and the like, and so as to be sufficiently deformable to pass over the upper portion of a side or end of a grain receiver in the event of contact therewith. Further, the discharge end of the tube and the spout can be rotatable laterally about the tube, to enable increased flexibility of grain distribution, and for storage in the closed position.

DETAILED DESCRIPTION OF THE INVENTION

Figure 1:
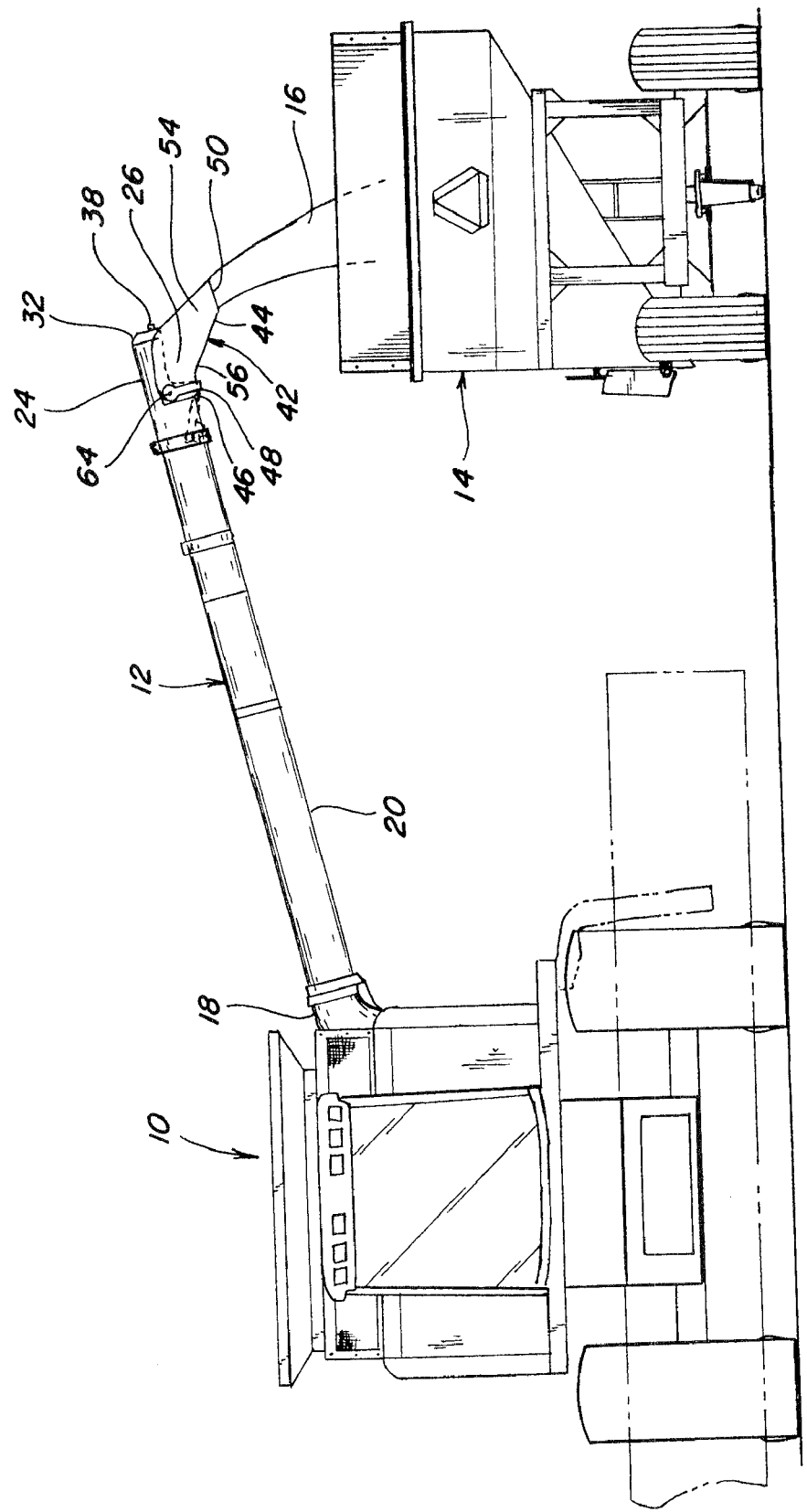
FIG. 1 is a front end view of a harvesting machine showing grain being unloaded from an unloading conveyor constructed and operable according to the present invention, into a wagon.
Figure 2:
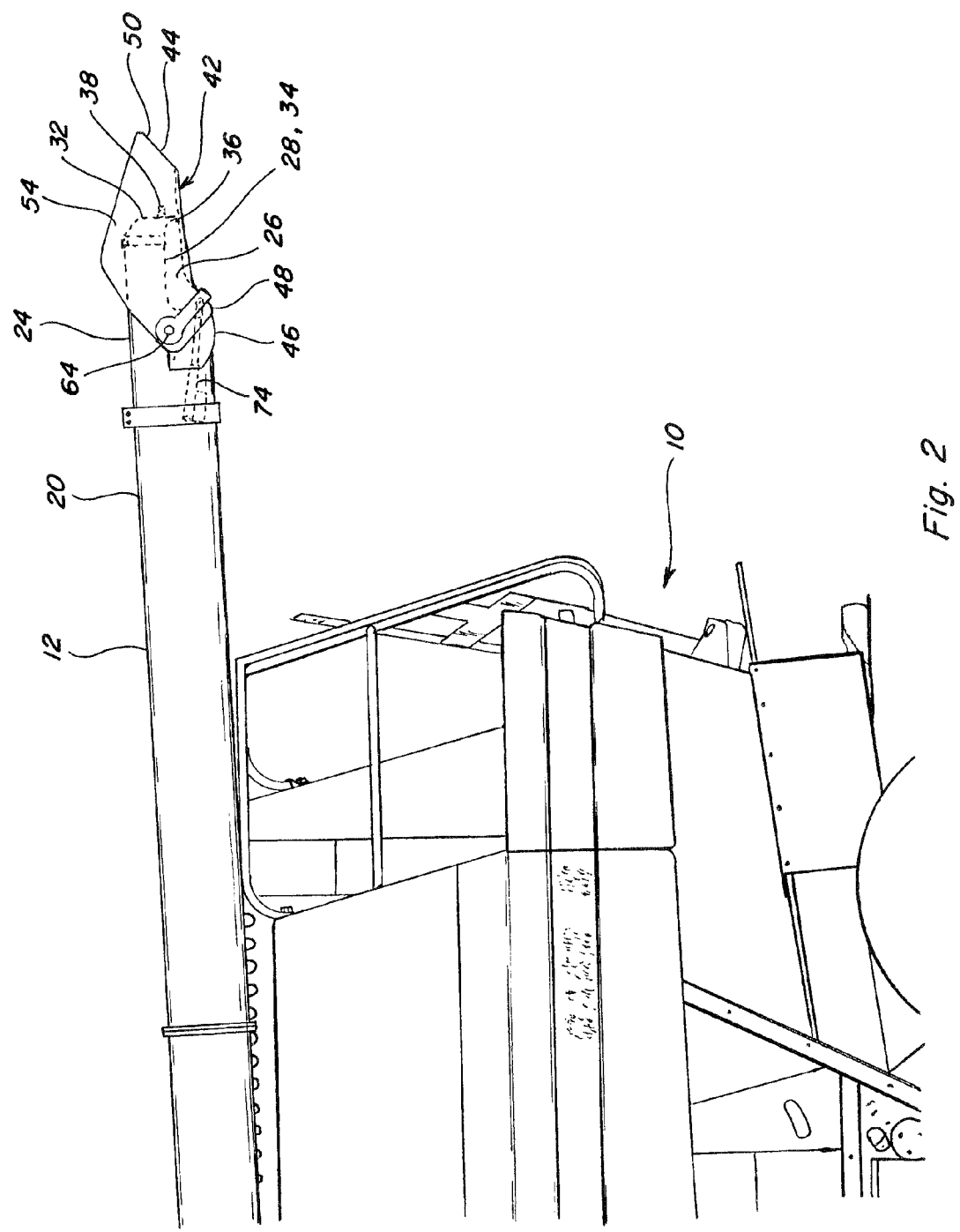
FIG. 2 is a fragmentary side view of the harvesting machine, showing the conveyor in a stored position, and a spout thereof in a closed position.

Referring now to FIGS. 1 and 2, a representative agricultural harvesting machine 10, which is a combine harvester of well-known construction and operation, is shown, including an unloading conveyor 12 constructed and operable according to the teachings of the present invention. In FIG. 1, unloading conveyor 12 is shown in a sidewardly and upwardly extending deployed or unloading position, for unloading grain into an accompanying container, which here is illustrated by a conventional agricultural grain wagon 14, in the well known manner. This is intended to be representative of a wide variety of unloading operations, wherein a flow of grain 16 from machine 10 is to be directed into a receiving container, such as wagon 14, periodically during operation of machine 10. In FIG. 2, unloading conveyor 12 is shown in a stored position extending rearwardly from a machine 10, also in the well known manner.

Unloading conveyor 12 generally includes a pivoting mounting end 18 connecting it to, and supporting it on, machine 10, for pivoting movement between the positions shown in FIGS. 1 and 2. Conveyor 12 includes an outer elongate cylindrical tube 20 containing a helical auger 22 (FIGS. 4, 6 and 7), auger 22 being rotatable within tube 20 for conveying grain internally within the tube, to a free discharge end 24 including a discharge opening 26, through which the grain is propelled as flow 16 illustrated in FIG. 1.

Figure 3:
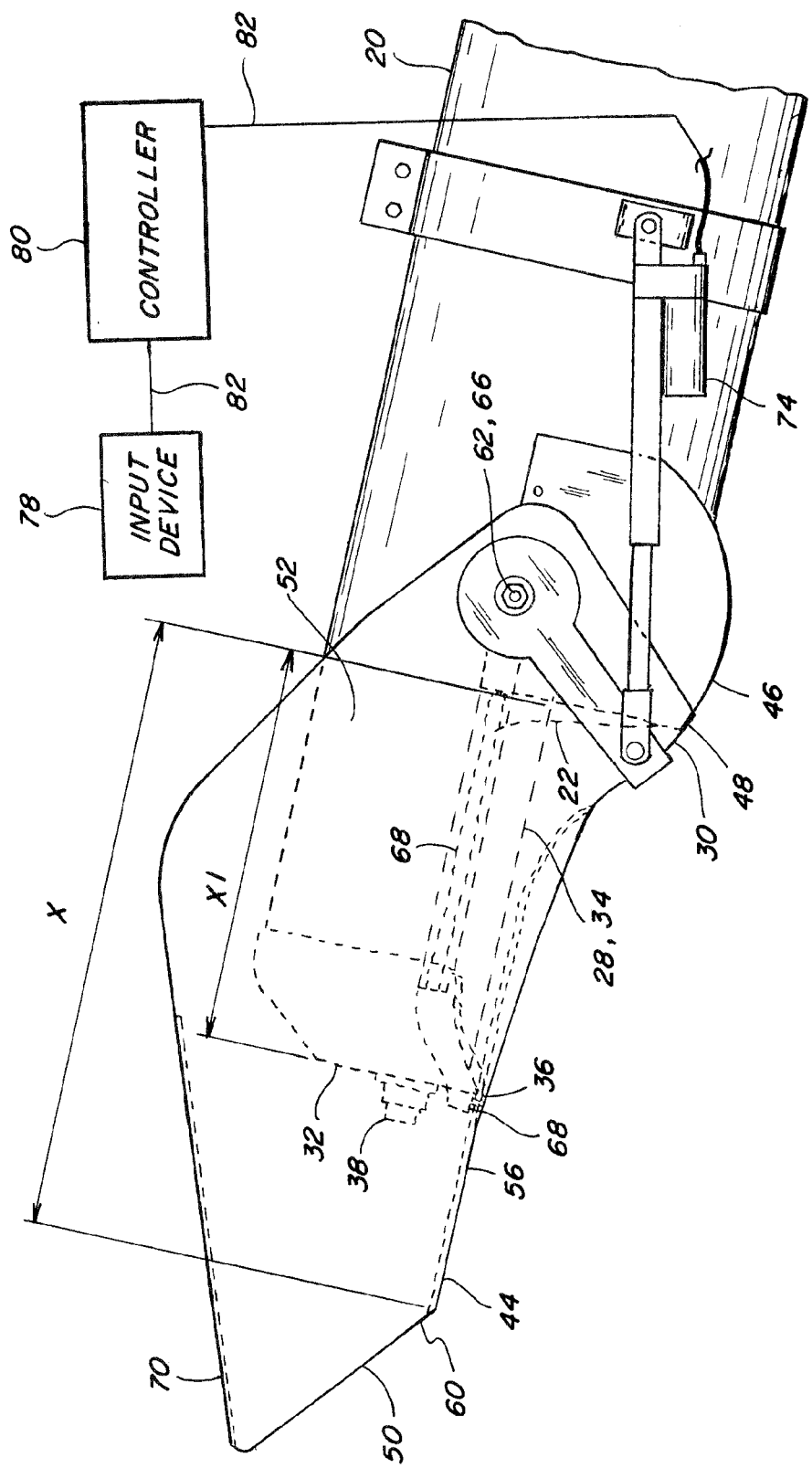
FIG. 3 is a fragmentary side view of a discharge end of the conveyor with the spout in the closed position.
Figure 4:
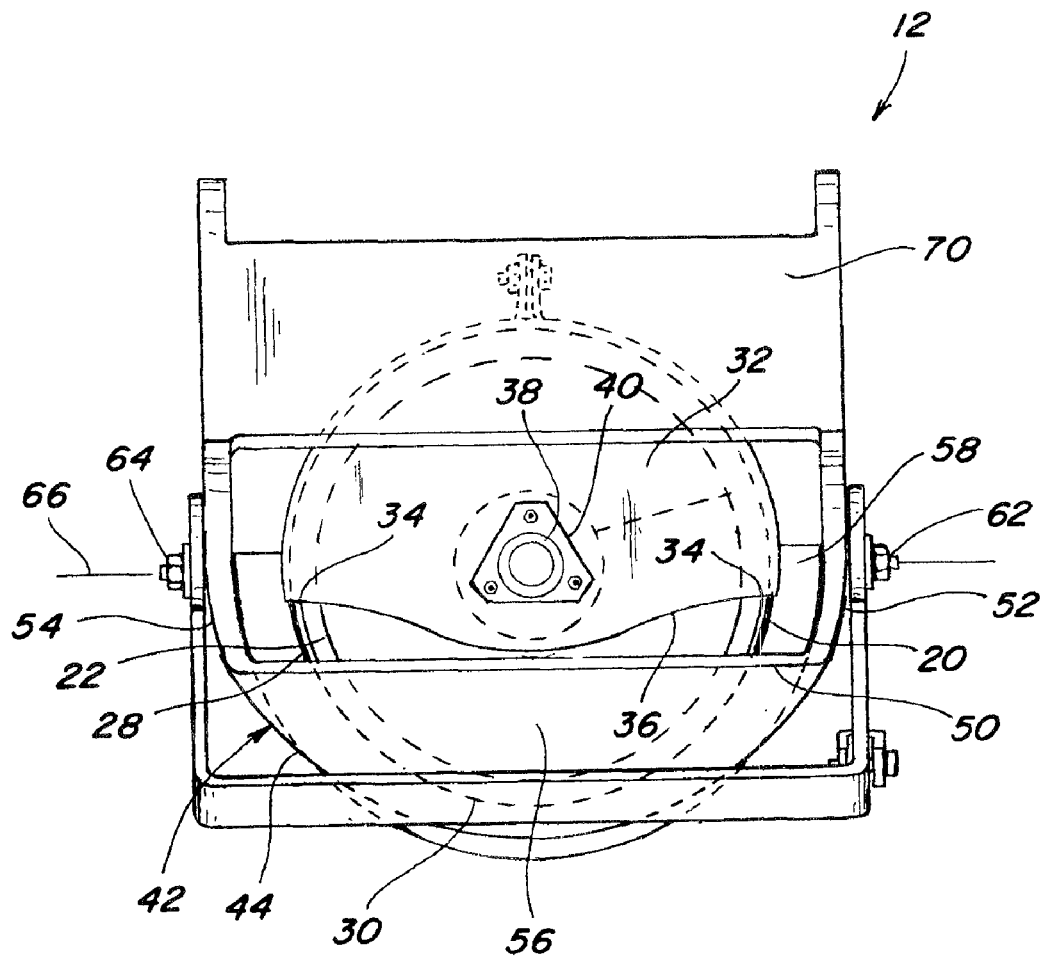
FIG. 4 is an end view of the conveyor, with the spout closed.

Referring also to FIGS. 3 and 4, discharge opening 26 is of conventional, a well-known construction and is a downwardly facing opening, having an elongate longitudinal shape, as defined and bounded by a peripheral edge portion 28 of tube 20, as variously illustrated in the figures. Peripheral edge portion 28 includes a transversely extending lower peripheral edge portion 30, longitudinally spaced from an endmost portion 32 of the discharge end of the tube, and which has an arcuate shape and bounds a lower periphery of opening 26. Peripheral edge portion 28 includes opposite side peripheral edge portions 34 extending longitudinally endwardly from opposite ends of lower peripheral edge portion 30 so as to bound the opposite sides of opening 26. Side peripheral edge portions 34 terminate at an upper peripheral edge portion 36 on endmost portion 32 of the tube, which bounds the end of opening 26 opposite lower peripheral edge portion 30. Helical auger 22 is supported on a longitudinally extending shaft 38 supported centrally within tube 20 by bearings, represented by endmost bearing 40 (FIG. 4) for rotation in the conventional manner for conveying grain through tube 20 toward discharge edge portion 24, and outwardly through opening 26.

As is well known, unloading grain from a conveyor, such as conveyor 12, through just a discharge opening 26, will produce an unguided gravity driven flow subject to dispersion and/or redirection by wind, so as to be poorly controllable and susceptible to spillage, as discussed above. Rubbery boots which extend partially or fully around the discharge opening have been tried with partial success, as also discussed above, but still result in relatively unguided grain flow which is easily dispersed and redirected by wind and the like, and control of the location of the grain flow is only achievable by moving the conveyor, and/or harvesting machine and receiving container. As also discussed above, this can be problematic, as there already may be relative movement of the harvester and receiving vehicle, changing terrain, and other factors which make precise grain unloading difficult. This arrangement alone is also always open, and provides no protection against grain dribbling.

Figure 5:
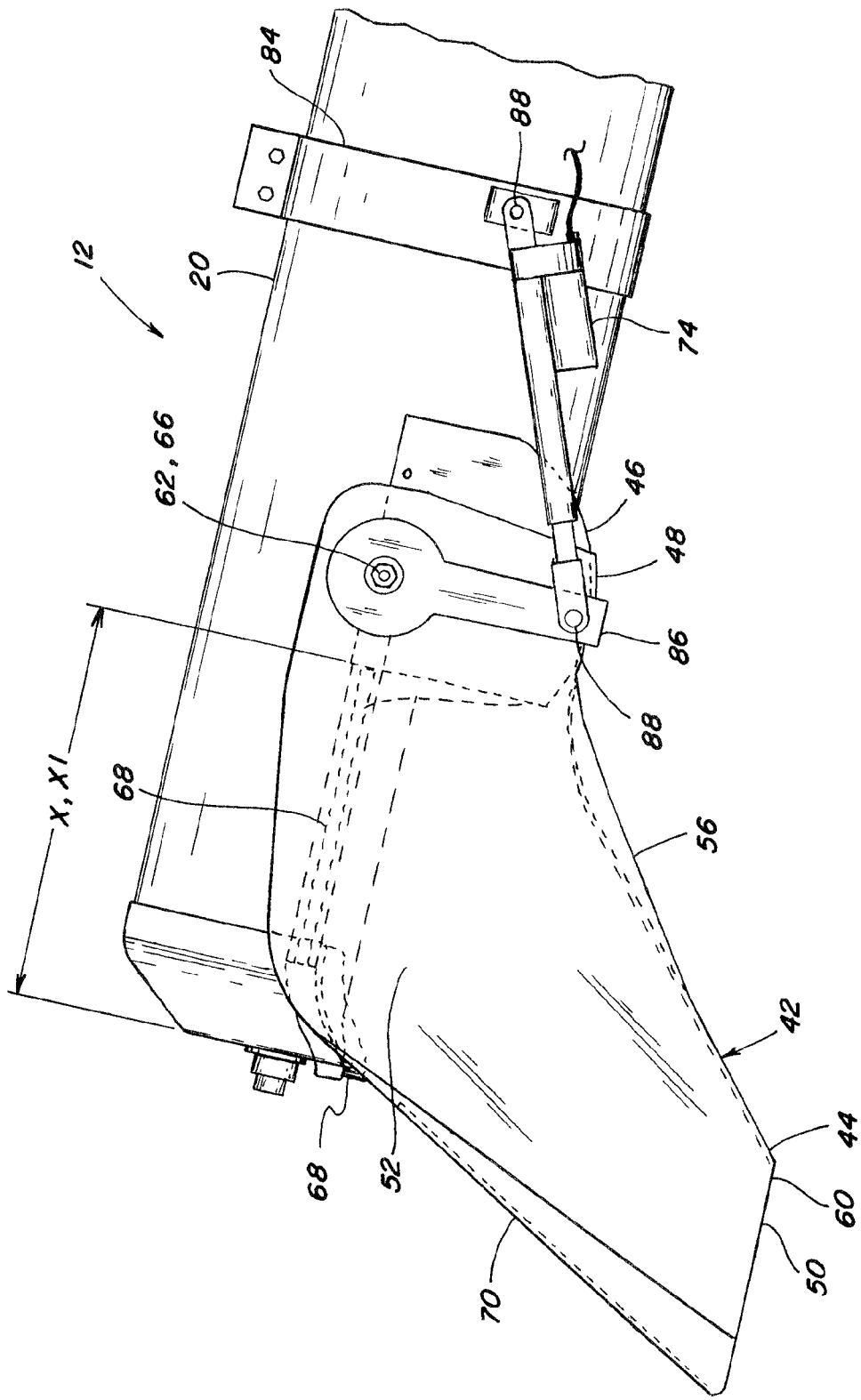
FIG. 5 is another fragmentary side view of the discharge end of the conveyor, showing the spout in an open position.
Figure 6:
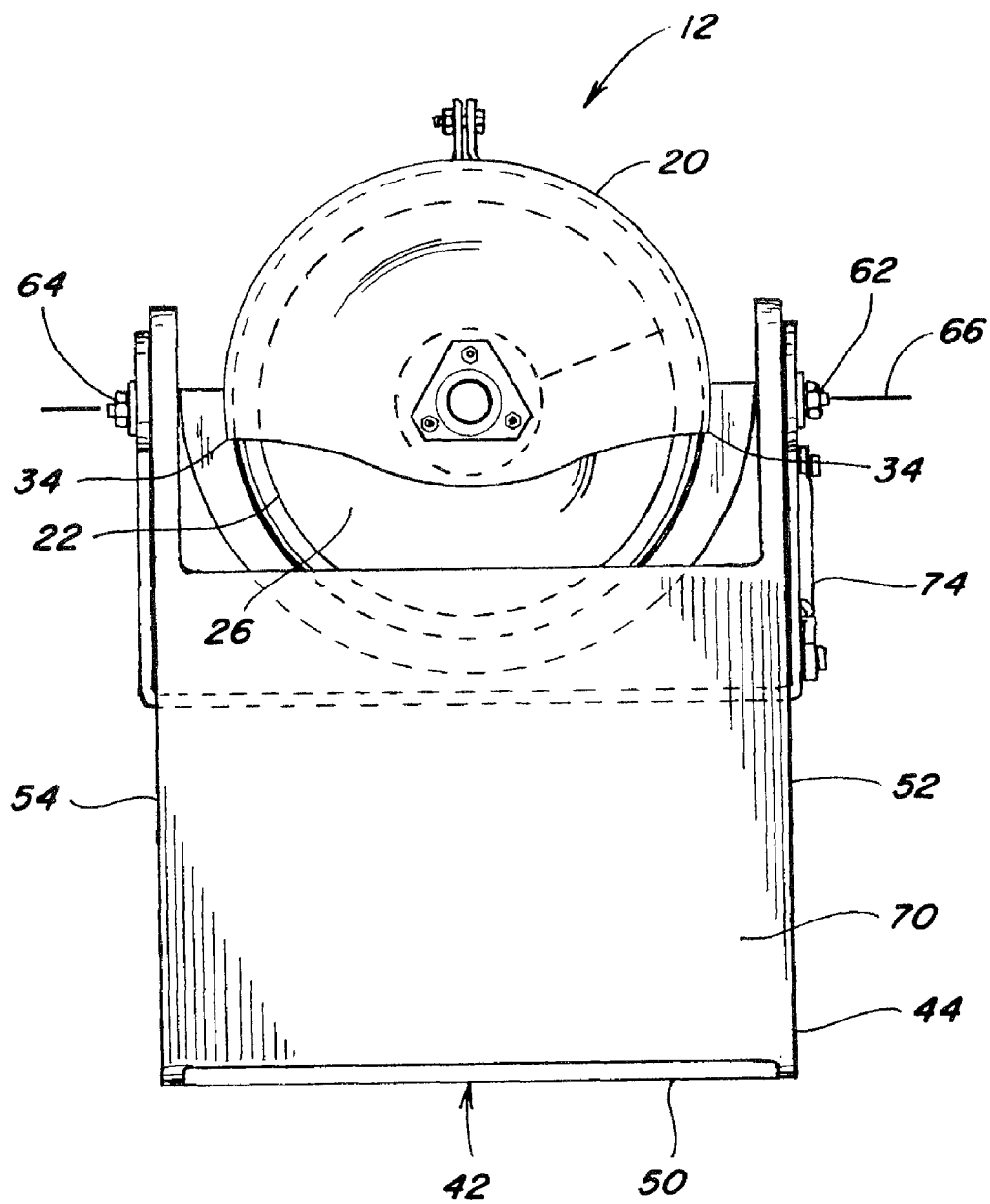
FIG. 6 is an end view of the conveyor with the spout open.

Referring also to FIGS. 5 and 6, the present invention improves the directability and controllability of the discharged grain flow, by providing a specialized spout assembly 42 in connection tube 20 of conveyor 12, including an elongate spout 44 controllably directable for enabling distributing grain in a desired manner within a region of a receiving storage container, or a transporting truck, wagon, or other vehicle, such as wagon 14. Spout assembly 42 also advantageously provides the ability to extend the distance of grain flow from a downwardly directed discharge opening, so as to increase the effective length of the conveyor, and is configurable as a closure for the discharge opening for preventing entry of contaminants and the like, and preventing grain dribbling.

Spout assembly 42 includes a protuberance 46 located on tube 20 adjacent to lower peripheral edge portion 30 which cooperates with a first open end portion 48 of spout 44, to provide a closure of that end of the spout when open and for preventing grain dribbling when closed. To facilitate these functions, first open end portion 48 and protuberance 46 have substantially conforming or mating transverse shapes, end portion 48 being marginally larger than protuberance 46 so as to be capable of passing therebelow in close proximity thereto or in contact therewith. Spout 44 includes a second open end portion 50 opposite first open end portion 48, spaced apart upwardly extending sidewall portions 52 and 54, and a bottom 56 therebetween defining an upwardly open channel 58 extending between open end portions 48 and 50, for carrying grain from tube 20. Here, bottom 56 has a transverse shape which transitions from more rounded to flat between end portions 48 and 50, although it should be noted that other shapes could be used, such as a uniformly rounded shape, a tapered shape, or a more uniformly flat shape.

Bottom 56, and thus upwardly open channel 58, has a longitudinal extent, denoted by letter X in FIG. 3, which is at least as long as a longitudinal extent of discharge opening 26, denoted by letter X1, so as to be adequate for providing a closure therefor when positioned in a closed position as shown, and preferably, which is substantially longer than extent X1 so as to extend a substantial distance beyond endmost portion of tube 20 when spout 44 is in this position. This additional length is not particularly advantageous when spout 44 is closed as shown in FIG. 3, but instead its advantage is apparent when the spout is open, as illustrated in FIG. 5. Extent X is preferably at least about 1.5 times greater than extent X1, although it should be noted that other lengths could be used for a particular application. This extended length X is advantageous, because when spout 44 is in an open position, it effectively extends the bottom of tube 20 to an outer edge 60 of bottom 56, as shown in FIG. 5, which is the location to which a flow of grain 16 will be physically carried by spout 44 before becoming free flowing. For the open spout position shown, this extension is to a location about equal to the extent of endmost portion 32 of tube 20. This is desirable, as it substantially increases the effective length of conveyor 12 by about this amount, and it increases the range of open positions of the spout, as explained next.

First open end portion 48 of spout 44 has elements, which preferably comprise upper end portions or extensions of sidewall portions 52 and 54, including aligned pivot joints 62 and 64 connecting to tube 20 and configured for allowing pivotal movement of spout 44 relative to tube 20 through a range of open positions between a fully open position (FIGS. 1, 5 and 6) extending downwardly at an acute angle from tube 20, and a closed position (FIGS. 2, 3 and 4), extending generally parallel to tube 20 in covering relation to discharge opening 26. Through this range, bottom 56 will maintain a close proximity to or contact with protuberance 46, to prevent grain loss therebetween, including dribbling when in the closed position. This is facilitated by the shape of protuberance 46, which is preferably an arcuate shape centered about a center or pivotal axis 66 of pivot joints 62 and 64, and thus the pivotal movement of bottom 56.

Additionally, to provide an enhanced anti-dribble capability, bottom 56 of spout 44 preferably has a convex shape adjacent to first open end portion 48 of the spout, which is oriented to extend upwardly from lower peripheral edge portion 30 of tube 20 when spout 44 is closed, to prevent grain from escaping, even when conveyor is in the lowered stored position and subject to jostling and vibrations from travel over rough and uneven terrain.

Figure 7:
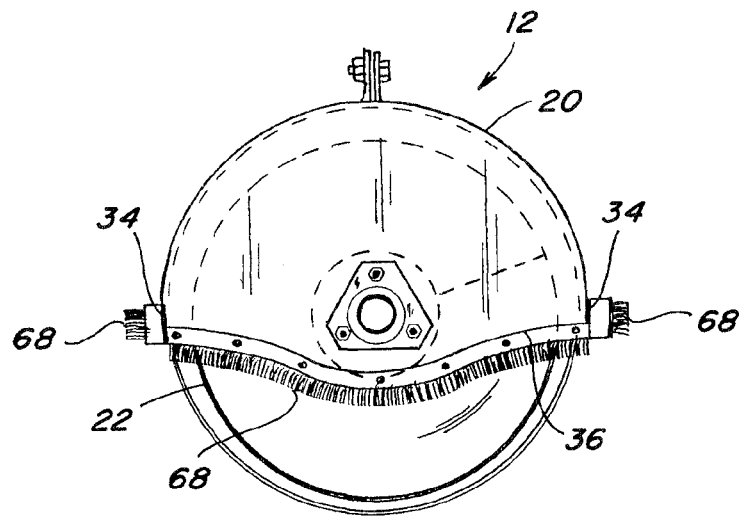
FIG. 7 is an end view of the conveyor, with the spout removed, to show one embodiment of a seal member for forming a sealed condition in cooperation with the spout.

Other features of spout 44 include that sidewall portions 52 and 54 extend upwardly at least to side peripheral edge portions 34 and 36 of tube 20 when the spout is in the open positions, which is advantageous as it prevents grain loss and passage of wind therebetween. Additionally, sidewall portions 52 and 54 will be located in closely spaced relation, or in contact, with side peripheral edge portions 34 of tube 20, particularly when spout 44 is closed, and bottom 56 will be close to, or in contact with, upper peripheral edge portion 36 when spout is closed, so as to optionally form a sealed condition therewith around discharge opening 26. As best shown in FIG. 7 wherein spout 44 is removed, this is facilitated by the positioning of a seal member or members 68 on or adjacent to the edge portions 34 and 36 of tube 20 of conveyor 12, in position for sealably engaging the spout around the opening. Seal member or members 68 preferably comprise brushes, or an elastomeric material such as a wipers or edge seals, capable of forming a desired sealed condition, e.g., for limiting or preventing entry of dust, straw, moisture, birds rodents, leaves and the like. As an example, seal member 68 across the bottom of endmost portion 32 of tube 20 can be configured, as a solid, yet compliant elastomeric wiper, lip, or the like, for forming a sealed condition in contact with bottom 56, to prevent entry of moisture into the closed region of opening 26 along bottom 56, if desired, in combination with a similar solid, compliant solid seal member 68 along sidewall portions 52 and 54, for completely enclosing the discharge opening.

Figure 8:
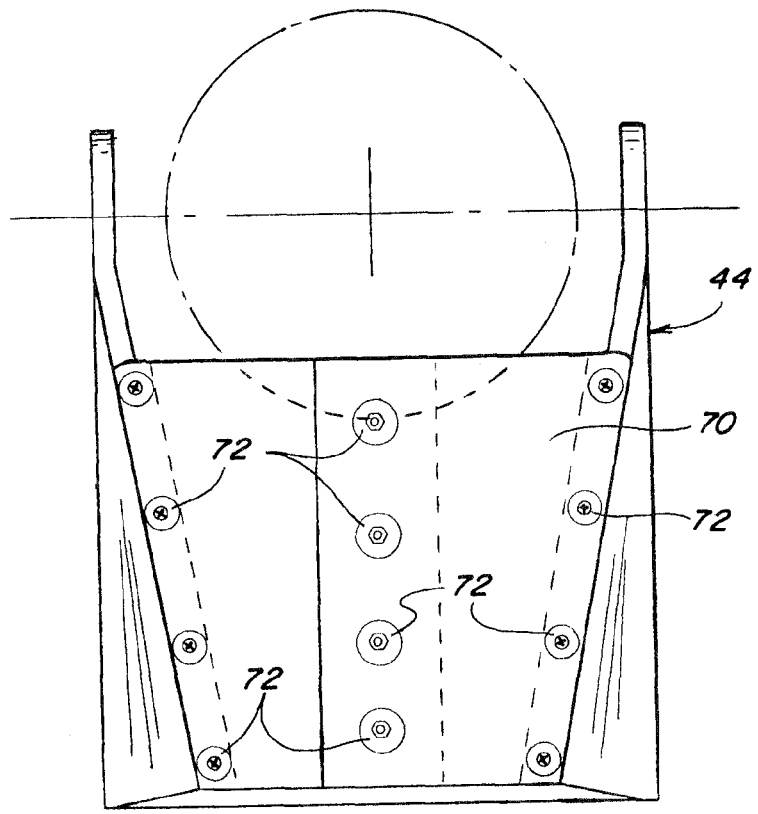
FIG. 8 is an end view of an alternative embodiment of the spout, having a break open capability.

As another feature, channel 58 of spout 44 adjacent to second open end portion 50 can include a cover portion 70, for containing or concentrating and further guiding grain flow 16, and further limiting effects of wind on grain flow. Cover portion 70 should be sized so as to allow closure of spout 44, yet provide the desired flow guiding and concentrating capabilities. Referring also to FIG. 8, cover portion 70 can be configured to break open or release when a predetermined force level is applied thereagainst from within channel 58, such as would be present if the grain flow generated by the operation of the auger was deadheaded, e.g., had nowhere to go, such as when buried deeply in grain or being discharged against the grain in an already full container. This can be achieved by frangible attachment of cover portion 70 to sidewall portions 52 and/or 54, and/or assembly of cover portion 70 using frangible or releasable elements such as bolts or fasteners 72 connecting segments of cover portion 70 at critical locations, such as at a middle seam or joint. This can also be used for configuring spout 44 for facilitating folding or deforming if forceful contact is made with a hard surface such as the side of a container such as a wagon or truck. Prestressed lines and/or living hinges can be provided for such purpose, and spout 44 and cover portion 70 can be constructed of a suitable material such as rigid yet resiliently yieldable plastics to facilitate deformation and recover to its original shape.

Figure 9:
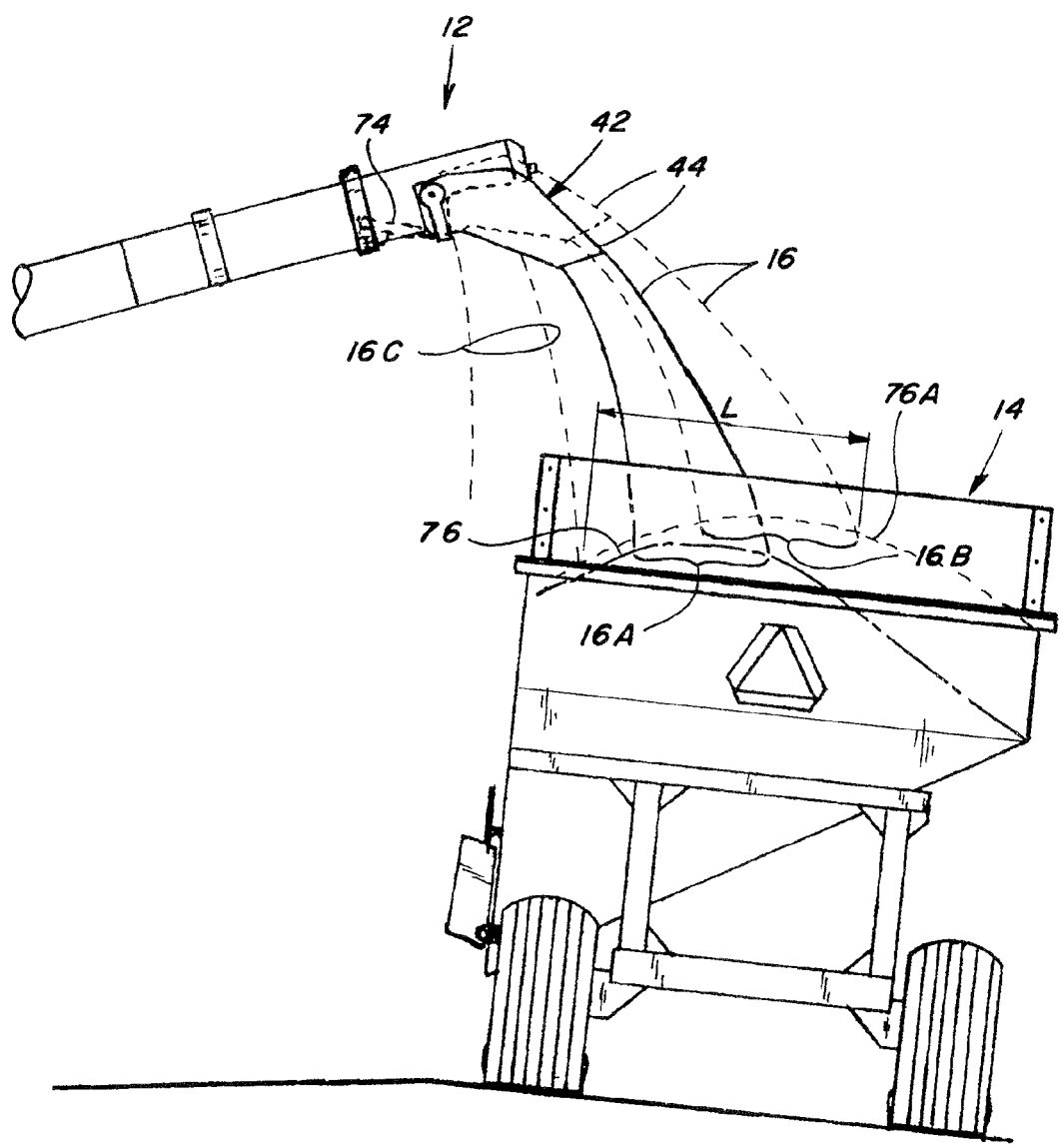
FIG. 9 is a fragmentary side view of the conveyor, illustrating grain being unloaded into a wagon, and illustrating in dotted lines adjustability of the spout for distributing the grain, and an increased distance of grain delivery that can be achieved using the spout, compared with not using the spout.

Referring also to FIG. 9, spout assembly 42 additionally includes an actuator 74 connected to spout 44 and controllably operable for moving it between the fully open position (FIGS. 1, 5, 6 and 9) and the closed position (FIGS. 2, 3 and 4), including through a range of open positions therebetween, as represented by the position shown in dotted lines in FIG. 9. As can be seen, this provides a range of locations for flow and deposition of grain 16, essentially as illustrated in solid and dotted lines in the figure. This is an advantageous capability, it enables variably directing the flow of grain 16 longitudinally relative to conveyor 12, at desired locations within a receiving container, as illustrated by locations 16A and 16B. This facilitates an ability to more evenly or fully fill a container such as wagon 14, as illustrated by accumulated grain 76 located more toward one side of wagon 14, and accumulated grain 76A located more in the center of the wagon. This also illustrates an amount by which the effective length of conveyor 12 can be adjustably increased, as denoted by arrow L, relative to a flow of grain 16C which can be achieved without spout 44.

Actuator 74 can be, for example, a conventional linear actuator (shown), a rotary actuator, or other suitable device of well known construction, controllably operable for moving spout 44 through the range of open positions as illustrated in FIG. 9, and to the closed position (FIGS. 2, 3 and 4), and can be electrical or fluid powered as desired. Referring more particularly to FIG. 3, actuator 74 can be controlled by a control system which can include an input device 78 which can be located in an operator cabin of machine 10, or elsewhere, such as a remote location, such as in the operator cab of a receiving vehicle, and optionally a controller 80, operable for controlling the movements of spout 44. Input device 78 will be connected to actuator 74, and optionally controller 80, via a suitable conductive path 82, which can be, for instance, wires of a wiring harness, or a wireless communications network (in which case the actuator being provided with another power source, as required).

The control of spout 44 may be independent or in concert with operation of conveyor 12, for instance, using a conventional unloading routine, as can be automatically controlled by a controller such as controller 80. Thus, as a non-limiting example, the controller 80 may be programmed to automatically move spout 44 from its closed position upon movement of conveyor 12 to its unloading position, to a pre-selected open position within the range illustrated in FIG. 9. After a time of operation of auger 22, actuator 74 may move spout 44 in a predetermined manner, or it may be moved using an input command from device 78. Then, when the unloading operation is complete, actuator 74 may automatically move spout 44 to the closed position, for instance, by initiation of movement of conveyor 12 to the stored position, or it may be closed by a command from device 78.

Still further, spout assembly 42 can be provided as a kit, so as to be sold separately, with harvester 10 or as an aftermarket product. Referring more particularly to FIG. 5, to facilitate this, and also installation generally, a band clamp 84 can be provided which is configured, e.g., sized and shaped, for attachment around tube 20 of conveyor 12. Protuberance 46 can be configured for fixed attachment to tube 20 adjacent to lower peripheral edge portion, and can include structure for attachment of pivot joints 62 and 64. Actuator 74 can attach between band clamp 84 and a U-shaped bracket 86 that supports spout 44 for pivotal movement about the pivot joints, via suitable pivots 88 and 90, such that extension of actuator 74 will effect closing movement of spout 44, and retraction will effect opening movement. Seal member 68 can be attached to tube 20 in any conventional manner, e.g., using fasteners, adhesives, or the like.

Figure 11:
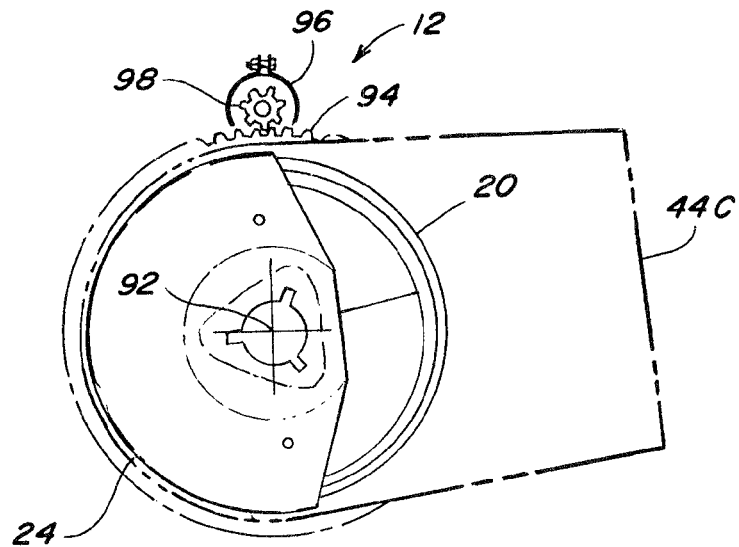
FIG. 11 is another end view of the conveyor including the apparatus for effecting rotation of the end of the conveyor and spout, with the spout illustrated in phantom in a closed position.
Figure 10:
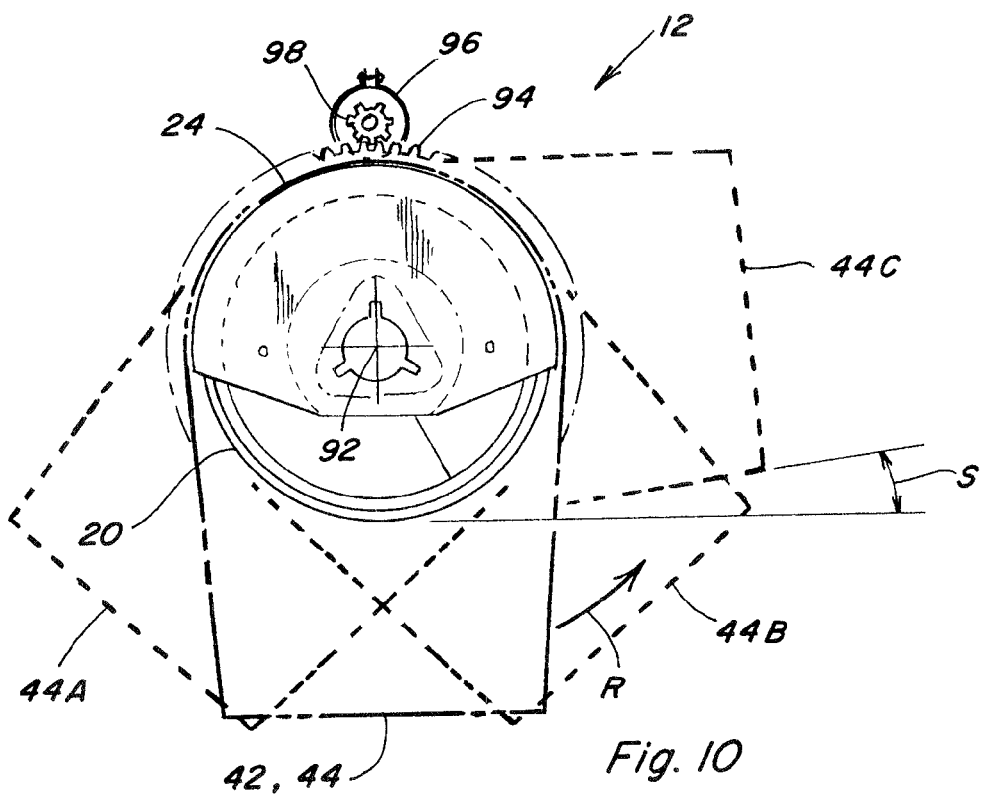
FIG. 10 is an end view of the conveyor, including optional apparatus operable for effecting rotation of the end thereof and the spout about a longitudinal axis of the conveyor, and illustrating the end and spout in dotted lines and in phantom in several alternative rotated positions.

Referring also to FIGS. 10 and 11, it is contemplated according to the invention, that conveyor 12 can be configured such that discharge end 24 and/or spout assembly 42 can be rotatable laterally relative to the rest of tube 20. Here, it is preferred that both discharge end 24 and spout assembly 42 be rotatable within a range of positions about a longitudinal axis 92 of tube 20, between about a position illustrated by spout 44A, and a position illustrated by spout 44C. The rotation can be effected by a suitable rotary joint at the juncture of tube 20 and discharge end 24, and including a full or partial ring gear 94 extending thereabout. A rotary actuator 96 including a gear 98 enmeshed with gear 94, or other suitable actuator can be used for effecting the rotary movement. Actuator 96 can be, for instance, an electric stepping motor precisely controllably rotatable through a range of rotary positions, as denoted by arrow R in FIG. 10. In operation, during unloading, this capability is advantageous, as it enables directing a stream of discharged grain more forwardly and rearwardly into a receiving device, in addition to the sideward distribution capability using actuator 74, discussed above, and in this regard, actuator 96 can be controlled in the same or a similar manner, and in concert with, actuator 74. Further, spout 44 can be rotated to any of the positions shown while open or closed, and can be closed and stored in the position 44C, oriented at an angle S above horizontal, to prevent or limit entry of contaminants, such as rain, into tube 20.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. An unloading conveyor system for an agricultural harvesting machine, comprising:

an elongate auger tube having a discharge end and containing a helical unloading auger rotatably operable for conveying grain toward the discharge end, the discharge end of the tube having a lower portion including a peripheral edge portion bounding a downwardly facing discharge opening having a longitudinal extent and a lateral extent and through which the grain will be discharged by the operation of the auger, the peripheral edge portion including a transversely extending lower peripheral edge portion longitudinally spaced from an endmost portion of the discharge end of the tube;

an elongate spout having a first open end portion, an opposite second open end portion, and spaced apart upwardly extending sidewall portions and a bottom therebetween defining an upwardly open channel extending between the open end portions, the first open end portion having elements disposed above the lower portion and including pivot joints connecting to the tube and configured for allowing pivotal movement of the spout relative to the tube through a range of open positions between a fully open position extending downwardly from the tube, and a closed position extending generally parallel to the tube in covering relation to the discharge opening so as to prevent grain loss therefrom, the lower portion of the first open end portion of the spout being configured to cooperate with an element on the tube adjacent to the lower peripheral edge portion for preventing passage of grain therebetween, and the sidewall portions extending upwardly at least to side portions of the peripheral edge portion of the tube when the spout is in the partial and fully open positions to prevent grain loss therebetween;

a first actuator connected to the spout and controllably operable for moving the spout between the fully open position and the closed position about a first axis; and a second actuator connected to the discharge end of the elongate auger tube, the second actuator controllably operable for moving the discharge end about a second axis, wherein the first axis is substantially perpendicular to and intersects the second axis, such that at least a portion of the spout and at least a portion of the discharge end are movable individually, sequentially or simultaneously on first and second axes while grain is moved therethrough; and an input device connected in operative control of the first and second actuator and operable for controlling operation of the first and second actuator.

2. The system of claim 1, wherein the input device is automatically operable.

3. The system of claim 1, wherein the input device is manually controllable.

4. The system of claim 1, wherein when in the closed position the spout will form a sealed condition with at least a portion of the peripheral edge portion of the tube adjacent to the discharge opening, for preventing entry of contaminants into the opening between the tube and the spout, and wherein the spout in the closed position prevents grain from dribbling therefrom when the auger is not in operation.

5. The system of claim 4, comprising a seal member disposed and configured for forming the sealed condition.

6. The system of claim 5, wherein the seal member comprises a brush.

7. The system of claim 5, where the seal member comprises an elastomeric member.

8. The system of claim of claim 1, wherein the spout includes a cover portion over the open channel adjacent to the second end portion, the cover portion being positioned and configured so as to be located endwardly beyond the discharge end of the tube when the spout is in the closed position.

9. The system of claim 8, wherein at least a portion of the cover portion is configured so as to be openable by application of a force exerted thereagainst from within the channel of the spout.

10. The system of claim 1, wherein the spout is pivotably movable on the first axis while being rotated with the discharge end on the second axis.

11. An unloading conveyor system for an agricultural harvesting machine, comprising:

an elongate auger tube having a discharge end and containing a helical unloading auger rotatably operable for conveying grain toward the discharge end, the discharge end of the tube having a lower portion including a peripheral edge portion bounding a downwardly facing discharge opening having a longitudinal extent and a lateral extent and through which the grain will be discharged by the operation of the auger, an endmost portion provided at an end of the discharge end of the tube;

an elongate spout having a first open end portion, an opposite second open end portion, and spaced apart upwardly extending sidewall portions and a bottom therebetween defining an upwardly open channel extending between the open end portions, the first open end portion including pivot joints connecting to the tube and configured for allowing pivotal movement of the spout relative to the tube through a range of open positions between a fully open position and a closed position in covering relation to the discharge opening so as to prevent grain loss therefrom, the lower portion of the spout being configured to cooperate with the discharge opening of the tube for preventing passage of grain therebetween, and the sidewall portions of the spout extending upwardly at least to side portions of the peripheral edge portion of the tube when the spout is in the partial and fully open positions to prevent grain loss therebetween;

a first actuator connected to the spout and controllably operable for moving the spout between the fully open position and the closed position about a first axis disposed in a transverse orientation relative to the auger tube;

a second actuator connected to the discharge end of the elongate auger tube, the second actuator controllably operable for moving the discharge end about a second axis, wherein the first axis is substantially perpendicular to and intersects the second axis, such that at least a portion of the spout and at least a portion of the discharge end are movable on first and second axes, respectively; and an input device connected in operative control of the first and second actuator and operable for controlling operation of the first and second actuator.

12. The system of claim 11, wherein when in the closed position the spout will form a sealed condition with at least a portion of the peripheral edge portion of the tube adjacent to the discharge opening, for preventing entry of contaminants into the opening between the tube and the spout, and wherein the spout in the closed position prevents grain from dribbling therefrom when the auger is not in operation.

13. The system of claim 12, comprising a seal member disposed and configured for forming the sealed condition.

14. The system of claim 11, wherein the spout includes a cover portion over the open channel, the cover portion being positioned and configured so as to be located endwardly beyond the discharge end of the tube when the spout is in the closed position.

15. The system of claim 14, wherein at least a portion of the cover portion is configured so as to be openable by application of a force exerted thereagainst from within the channel of the spout.

16. The system of claim 11, wherein the spout is pivotably moved on the first axis by the first actuator.

17. The system of claim 11, wherein the discharge end is rotatably moved on the second axis by the second actuator.

18. The system of claim 17, wherein the spout is disposed on the discharge end and is pivotably movable on the first axis while being rotated with the discharge end on the second axis.

19. The system of claim 11, wherein at least the portion of the spout and at least the portion of the discharge end are movable individually, sequentially or simultaneously on first and second axes.

20. The system of claim 19, wherein the portion of the spout and the portion of the discharge end are movable individually, sequentially or simultaneously on first and second axes while grain is moved therethrough.

21. An unloading conveyor system for an agricultural harvesting machine, comprising:

an elongate auger tube having a discharge end and containing a helical unloading auger rotatably operable for conveying grain toward the discharge end, the discharge end of the tube having a lower portion including a peripheral edge portion bounding a downwardly facing discharge opening through which the grain will be discharged by the operation of the auger, an endmost portion provided at an end of the discharge end of the tube;

an elongate spout having a first open end portion, an opposite second open end portion, and spaced apart upwardly extending sidewall portions and a bottom therebetween defining an upwardly open channel extending between the open end portions, the first open end portion including pivot joints connecting to the tube and configured for allowing pivotal movement of the spout relative to the tube through a range of open positions between a fully open position extending downwardly from the tube, and a closed position extending generally parallel to the tube in covering relation to the discharge opening so as to prevent grain loss therefrom, the lower portion of the spout being configured to cooperate with the discharge opening of the tube for preventing passage of grain therebetween, and the sidewall portions of the spout extending upwardly at least to side portions of the peripheral edge portion of the tube when the spout is in the partial and fully open positions to prevent grain loss therebetween;

a first actuator connected to the spout and controllably operable for moving the spout between the fully open position and the closed position about a first axis; and a second actuator connected to the discharge end of the elongate auger tube, the second actuator controllably operable for moving the discharge end about a second axis, wherein the first axis is substantially perpendicular to and intersects the second axis, the second actuator configured to engage the discharge end to rotate the discharge end at an angle above horizontal about the second axis so that contaminants are prevented from entering the discharge opening.

22. The system of claim 21, wherein when in the closed position the spout will form a sealed condition with at least a portion of the peripheral edge portion of the tube adjacent to the discharge opening, for preventing entry of contaminants into the opening between the tube and the spout, and wherein the spout in the closed position prevents grain from dribbling therefrom when the auger is not in operation.

23. The system of claim of claim 21, wherein the spout includes a cover portion over the open channel, the cover portion being positioned and configured so as to be located endwardly beyond the discharge end of the tube when the spout is in the closed position.

24. The system of claim 21, further comprising an input device connected in operative control of first and second actuators and operable for controlling operation of the first and second actuators.

25. The system of claim 21, wherein the spout is pivotably moved on the first axis by the first actuator.

26. The system of claim 25, wherein the spout is disposed on the discharge end and rotates about the second axis along with the discharge end when the discharge end is moved by the second actuator.

27. The system of claim 26, wherein the spout is movable between the open and closed position on the first axis during rotation of the discharge end on the second axis.

28. The system of claim 21, wherein at least the portion of the spout and at least the portion of the discharge end are movable individually, sequentially or simultaneously on first and second axes, respectively.

29. The system of claim 28, wherein the portion of the spout and the portion of the discharge end are movable individually, sequentially or simultaneously on first and second axes, respectively, while grain is moved therethrough.

30. The system of claim 21, wherein the angle of rotation about the second axis is more than 90 degrees.

31. The system of claim 21, wherein a rotary joint is formed near the discharge end of the auger tube.

32. The system of claim 31, wherein at least a partial ring gear extends adjacent to the rotary joint.

33. The system of claim 32, wherein the second actuator includes a gear engaged with the ring gear to rotatably move the discharge end.

34. The system of claim 33, wherein the second actuator comprises an electric stepping motor.

35. An assembly for an unloading conveyor system for an agricultural harvesting machine, the unloading conveyor system comprising an elongate auger tube having an open end and containing a helical unloading auger rotatably operable for conveying grain toward the open end, the assembly comprising:

a discharge end configured to connect to the open end of an elongate auger tube, the discharge end including a first open end which is configured to cooperate with the open end of the elongate auger tube to provide a rotatable closure thereover, the discharge end having a second end having a lower portion including a peripheral edge portion bounding a downwardly facing discharge opening, an endmost portion provided at an end of the discharge tube, and a rotary joint disposed at the first end of the discharge end and configured to be positioned at a juncture with the open end of the elongate auger tube, at least a partial ring gear extending about at least a portion of the periphery of the discharge end, an elongate spout configured to connect to the discharge end to provide a pivotable closure to the discharge opening, the elongate spout including a first open end portion, an opposite second open end portion, and spaced apart upwardly extending sidewall portions and a bottom therebetween defining an upwardly open channel extending between the open end portions, the first open end portion including pivot joints configured to be connected to a portion of the discharge end to allow pivotal movement of the spout relative to the discharge end through a range of open positions between a fully open position extending downwardly from the tube, and a closed position extending generally parallel to the tube in covering relation to the discharge opening so as to prevent grain loss therefrom, the lower portion of the spout being configured to cooperate with the discharge opening of the discharge end for preventing passage of grain therebetween, and sidewall portions of the spout extending upwardly at least to side portions of the discharge end when the spout is in the partial and fully open positions to prevent grain loss therebetween;

a first actuator configured to be connected to the spout to move the spout between the fully open position and the closed position about a first axis; and a second actuator configured to be connected to one of the discharge end or the auger tube, the second actuator configured to engage the at least partial ring gear to move the discharge end about a second axis, wherein the first axis is substantially perpendicular to and intersects the second axis, wherein the second actuator rotates the discharge end at an angle above horizontal about the second axis to prevent contaminants from entering the discharge opening, and wherein the first actuator and the second actuator are configured to be connected to an input device for controlling movement of first and second actuators.

36. The system of claim 35, wherein the input device is in operative control of first and second actuators when first and second actuators are connected thereto and operable for controlling operation of the first and second actuators.

37. The system of claim 35, wherein the spout is pivotably movable.

38. The system of claim 37, wherein the spout rotates about the second axis along with the discharge end when the discharge end is moved by the second actuator.

39. The system of claim 38, wherein the spout is movable between the open and closed position on the first axis during rotation of the discharge end on the second axis.

40. The system of claim 35, wherein at least the portion of the spout and at least the portion of the discharge end are movable individually, sequentially or simultaneously on first and second axes, respectively.

41. The system of claim 40, wherein the portion of the spout and the portion of the discharge end are movable individually, sequentially or simultaneously on first and second axes, respectively, while grain is moved therethrough.

42. The system of claim 35, wherein the angle of rotation about the second axis is more than 90 degrees.

43. The system of claim 35, wherein the second actuator includes a gear engaged with the ring gear to rotatably move the discharge end.

44. The system of claim 43, wherein the second actuator comprises an electric stepping motor.

* * * * *